United States Patent
Chu

(10) Patent No.: US 9,973,025 B2
(45) Date of Patent: May 15, 2018

(54) POWER PROVIDING EQUIPMENT, MOBILE DEVICE, OPERATING METHOD OF MOBILE DEVICE

(71) Applicant: HTC Corporation, Taoyuan (TW)

(72) Inventor: Feng-Seng Chu, Taoyuan (TW)

(73) Assignee: HTC Corporation, Taoyuan (TW)

(*) Notice: Subject to any disclaimer, the term of this patent is extended or adjusted under 35 U.S.C. 154(b) by 187 days.

(21) Appl. No.: 14/698,827

(22) Filed: Apr. 28, 2015

(65) Prior Publication Data

US 2015/0311743 A1    Oct. 29, 2015

Related U.S. Application Data

(60) Provisional application No. 61/985,481, filed on Apr. 29, 2014.

(51) Int. Cl.
*H02J 50/00* (2016.01)
*H02J 50/80* (2016.01)
(Continued)

(52) U.S. Cl.
CPC .............. *H02J 7/025* (2013.01); *H02J 5/005* (2013.01); *H02J 7/0047* (2013.01); *H02J 7/045* (2013.01);
(Continued)

(58) Field of Classification Search
CPC ................................ H02J 7/0251; H02J 5/005
(Continued)

(56) References Cited

U.S. PATENT DOCUMENTS

2008/0174267 A1    7/2008 Onishi et al.
2012/0133335 A1*   5/2012 Tanabe .................... H02J 7/025
                                                              320/137
(Continued)

FOREIGN PATENT DOCUMENTS

EP    2086085 A1    8/2009
EP    2696468 A1    2/2014

OTHER PUBLICATIONS

Corresponding European Office Action that these art references were dated Jul. 24, 2015.
(Continued)

*Primary Examiner* — Drew A Dunn
*Assistant Examiner* — Sailesh Thapa
(74) *Attorney, Agent, or Firm* — CKC & Partners Co., Ltd.

(57) ABSTRACT

An operating method includes receiving a power signal from a power providing equipment, transmit a first end power transfer message to the power providing equipment under a condition that the power of the battery is full, so that the power providing equipment stops providing the wireless power signal according to the first end power transfer message; charging the battery by utilizing the wireless power signal under a condition that the power of the battery is not full; and transmitting a second end power transfer message to the power providing equipment under a condition that the battery is fully charged by the charging module, so that the power providing equipment stops providing the wireless power signal according to the second end power transfer message. The first end power transfer message and the second end power transfer message are different.

20 Claims, 5 Drawing Sheets

(51) Int. Cl.
*H02J 50/10* (2016.01)
*H02J 7/02* (2016.01)
*H02J 5/00* (2016.01)
*H02J 7/04* (2006.01)
*H02J 7/00* (2006.01)
*H04B 5/00* (2006.01)

(52) U.S. Cl.
CPC .............. *H02J 50/00* (2016.02); *H02J 50/10* (2016.02); *H02J 50/80* (2016.02); *H04B 5/0037* (2013.01); *H02J 2007/0049* (2013.01)

(58) Field of Classification Search
USPC ........................................................ 320/108
See application file for complete search history.

(56) References Cited

U.S. PATENT DOCUMENTS

| | | | |
|---|---|---|---|
| 2013/0082653 A1* | 4/2013 | Lee ...................... | H02J 7/0027 320/108 |
| 2013/0200844 A1 | 8/2013 | Lee et al. | |
| 2015/0372531 A1* | 12/2015 | Tanabe ................... | H02J 5/005 320/108 |

OTHER PUBLICATIONS

Wireless power consortium, "System Description, wireless power transfer," vol. I, part I, version 1.1.2, Jun. 2013.

\* cited by examiner

POWER PROVIDING EQUIPMENT, MOBILE DEVICE, OPERATING METHOD OF MOBILE DEVICE

RELATED APPLICATIONS

This application claims priority to U.S. Provisional Application Ser. No. 61/985,481, filed Apr. 29, 2014, which is herein incorporated by reference.

BACKGROUND

Technical Field

The present disclosure relates to an electronic device and a method. More particularly, the present disclosure relates to a power providing equipment a mobile device, and an operating method of a mobile device.

Description of Related Art

With advances in electronic technology, wireless power systems have been widely used.

A typical wireless power system includes a power transmitter and a power receiver. When the power receiver (usually be a mobile device) approaches the power transmitter, the power transmitter can charge the power receiver. Through such an operation, it is convenience for users to charge their mobile devices without cables.

SUMMARY

One aspect of the present disclosure is related to a mobile device. In accordance with one embodiment of the present disclosure, the mobile device includes a battery, a wireless power transceiver, a communication transmitter, a charging module, and a processor. The wireless power receiver is configured for receiving a wireless power signal from a power providing equipment. The processor is electrically connected with the battery, the wireless power receiver, the communication transmitter, and the charging module. The processor is configured for controlling the communication transmitter to transmit a first end power transfer message to the power providing equipment under a condition that the power of the battery is full at a beginning of the wireless power receiver receiving the wireless power signal from the power providing equipment, so that the power providing equipment stops providing the wireless power signal according to the first end power transfer message; controlling the charging module to charge the battery by utilizing the wireless power signal received from the power providing equipment under a condition that the power of the battery is not full; and controlling the communication transmitter to transmit a second end power transfer message to the power providing equipment under a condition that the battery is fully charged by the charging module, so that the power providing equipment stops providing the wireless power signal according to the second end power transfer message. The first end power transfer message and the second end power transfer message are different.

Another aspect of the present disclosure relates to a power providing equipment. In accordance with one embodiment of the present disclosure, the power providing equipment includes a wireless power transceiver, a communication receiver, and a processor. The wireless power transmitter is configured for transmitting a wireless power signal to a mobile device. The processor is electrically connected with the wireless power transmitter and the communication receiver. The processor is configured for determining whether a first end power transfer message from the mobile device is received, wherein the first end power transfer message indicates a power of a battery of the mobile device is full at a beginning of the wireless power transmitter transmitting the wireless power signal to the mobile device; controlling the wireless power transmitter to stop transmitting the wireless power signal to the mobile device under a condition that the first end power transfer message is received; receiving, through the communication receiver, a second end power transfer message from the mobile device under a condition that the battery is fully charged by utilizing the wireless power signal transmitted from the wireless power transmitter; and controlling the wireless power transmitter to stop the power signal corresponding to the second end power transfer message. The first end power transfer message and the second end power transfer message are different.

Another aspect of the present disclosure relates to an operating method of a mobile device. In accordance with one embodiment of the present disclosure, the operating method includes receiving a power signal from a power providing equipment, transmit a first end power transfer message to the power providing equipment under a condition that the power of the battery is full at a beginning of receiving the wireless power signal from the power providing equipment, so that the power providing equipment stops providing the wireless power signal according to the first end power transfer message; charging the battery by utilizing the wireless power signal received from the power providing equipment under a condition that the power of the battery is not full; and transmitting a second end power transfer message to the power providing equipment under a condition that the battery is fully charged by the charging module, so that the power providing equipment stops providing the wireless power signal according to the second end power transfer message. The first end power transfer message and the second end power transfer message are different.

Through an application of one embodiment described above, the power providing equipment is able to detect whether an original mobile device is replaced by another mobile device with a full battery according to the first end power transfer message and the second end power transfer message, so as to prevent the original mobile device from being stolen.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
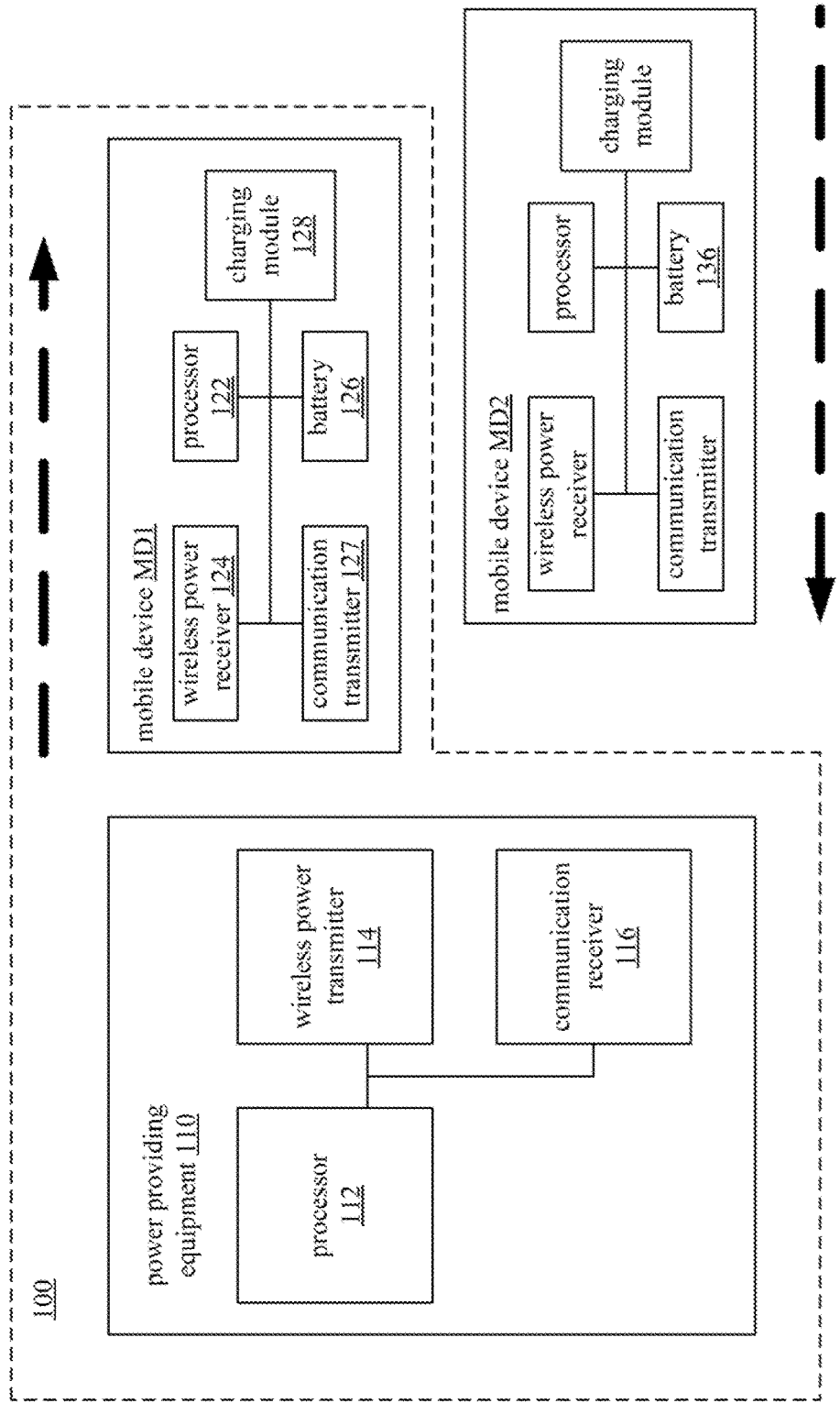
FIG. 1 illustrates a wireless power system in accordance with one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 § 112(f).

One aspect of the present disclosure is related to a mobile device. In the paragraphs below, a smart phone or a tablet computer will be taken as an example to describe details of the mobile device. However, the present disclosure is not limited in this regard.

FIG. 1 illustrates a wireless power system 100 in accordance with one embodiment of the present disclosure. In this embodiment, the wireless power system 100 includes a power providing equipment 110 and a mobile device MD1. In this embodiment, the power providing equipment 110 includes a processor 112, a wireless power transmitter 114, and a communication receiver 116. The processor 112, the wireless power transmitter 114, and the communication receiver 116 are electrically connected. In this embodiment, the mobile device MD1 includes a processor 122, a wireless power receiver 124, a battery 126, a communication transmitter 127, and a charging module 128. The processor 122, the wireless power receiver 124, the battery 126, the communication transmitter 127, and the charging module 128 are electrically connected.

In one embodiment, each of the processors 112, 122 can be realized by, for example, a processor, such as a central processor, or a microprocessor, but is not limited in this regard. In one embodiment, each of the wireless power transmitter 114 and the wireless power receiver 124 may be realized by, for example, a coil, but is not limited in this regard. In one embodiment, each of the communication receiver 116 and the communication transmitter 127 may be realized by a suitable communication module, such as a wifi module or a bluebooth module, but is not limited in this regard. In one embodiment, the charging module 128 may be realized by, for example, a circuit, but is not limited in this regard.

In one embodiment, the processor 112 of the power providing equipment 110 is configured to control the wireless power transmitter 114 to transmit a wireless power signal to the mobile device MD1 to charge the battery 126 of the mobile device MD1. The processors 122 of the mobile device MD1 is configured to determine whether to control the communication transmitter 127 to request the power providing equipment 110 to stop charging the battery 126 of the mobile device MD1 according to the power of the battery 126 or charging statues. In one embodiment, the operations between the power providing equipment 110 and the mobile device MD1 conform to the regulations defined in a document "Wireless Power Transfer" released by Wireless Power Consortium (WPC).

Details of the present disclosure are described in the paragraphs below with reference to an operating method of a power providing equipment in FIG. 2. However, the present disclosure is not limited to the embodiment below.

It should be noted that the operating method can be applied to a power providing equipment having a structure that is the same as or similar to the structure of the power providing equipment 110 shown in FIG. 1. To simplify the description below, in the following paragraphs, the embodiment shown in FIG. 1 will be used as an example to describe the operating method according to an embodiment of the present disclosure. However, the present disclosure is not limited to application to the embodiment shown in FIG. 1.

In addition, it should be noted that in the steps of the following operating method, no particular sequence is required unless otherwise specified. Moreover, the following steps also may be performed simultaneously or the execution times thereof may at least partially overlap.

Furthermore, the steps of the following operating method may be added to, replaced, and/or eliminated as appropriate, in accordance with various embodiments of the present disclosure.

Figure 2:
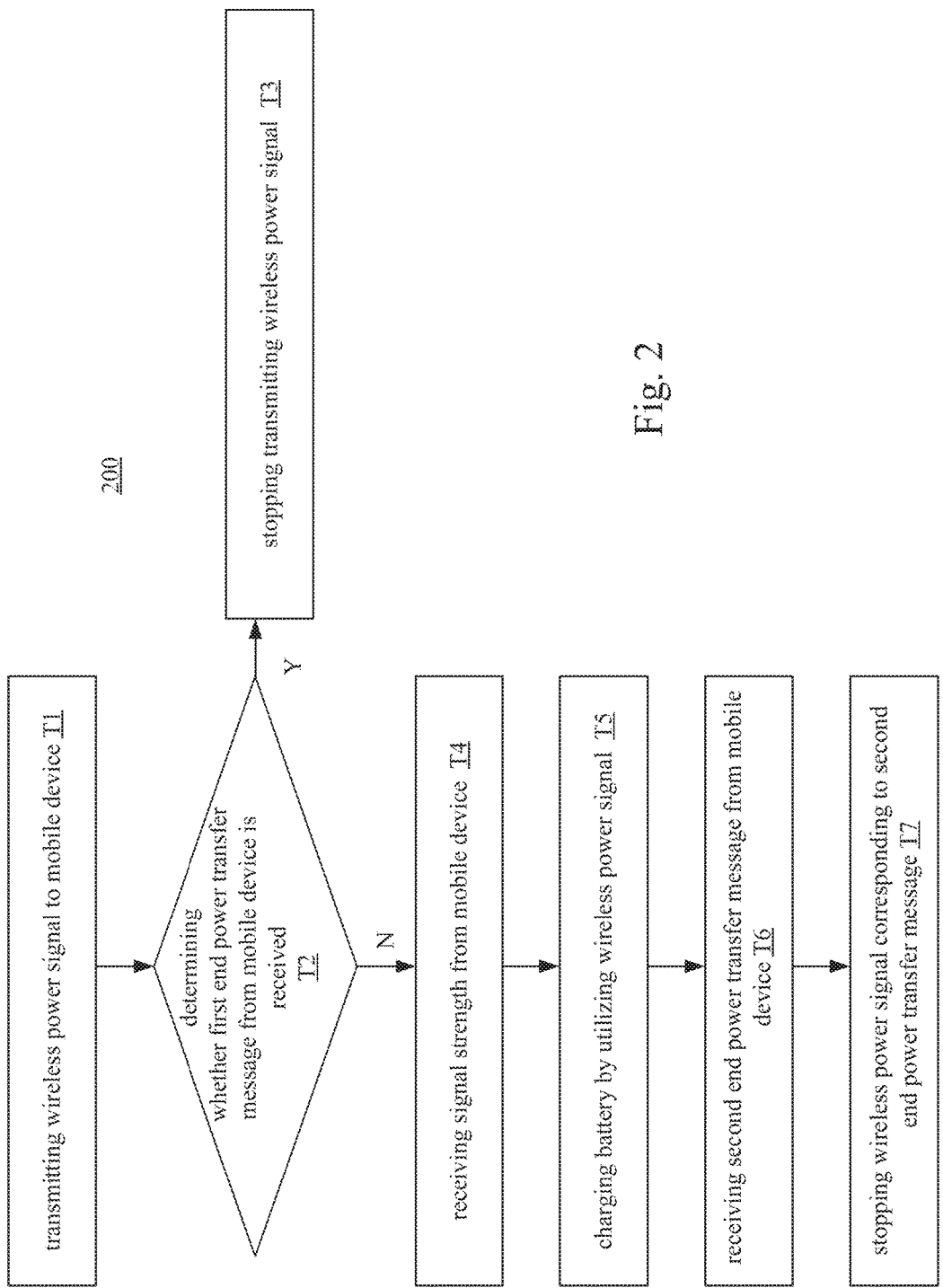
FIG. 2 is a flowchart of an operating method of a power providing equipment in accordance with one embodiment of the present disclosure.

Reference is made to FIG. 2. The operating method 200 includes the steps below.

In step T1, the power providing equipment 110 is in a Selection phase. The processor 112 detects whether a mobile device approaches. When the mobile device MD1 approaches the power providing equipment 110, the processor 112 may control the wireless power transceiver 116 to transmit a wireless power signal to the mobile device MD1 to make the mobile device MD1 to response according to the wireless power signal.

In step T2, after the processor 112 transmits the wireless power signal to the mobile device MD1, the processor 112 determines whether a first end power transfer message, which indicates a power of the battery 126 of the mobile device MD1 is full, is received through the communication receiver 116. If so, step S3 is executed. If not, step S4 is executed.

In step T3, under a condition that the first end power transfer message is received, the processor 112 controls the wireless power transceiver 116 to stop the wireless power signal and refrains charging the battery 126 of the mobile device MD1.

In step T4, under a condition that the first end power transfer message is not received, the processor 112 receives a signal strength packet from the mobile device MD1 through the communication receiver 116, which indicates the degree of coupling between the wireless power transmitter 114, and the wireless power receiver 124.

After the power providing equipment 110 receives the signal strength packet from the mobile device MD1, the power providing equipment 110 enters an Identification and Configuration phase. In such a phase, the processor 112 receives identification information of the mobile device MD1 from the mobile device MD1 through the communication receiver 116.

In one embodiment, the identification information includes a unique ID of the mobile device MD1 or the wireless power receiver 124. In one embodiment, the unique ID is determined by the manufacturer of the mobile device MD1 or the wireless power receiver 124. In one embodiment, the unique ID includes a manufacture code and a (basic/extended) device identifier. In one embodiment, the unique ID corresponds to some modules in the mobile device MD1 other than the wireless power receiver 124. In one embodiment, the unique ID corresponds to an international mobile subscriber identity (IMSI) and/or a radio network temporary identifier (RNTI) of a cellular module (not shown). In one embodiment, the unique ID corresponds to a near field communication (NFC) ID of a NFC module (not shown) and/or a bluetooth low energy (BLE) ID of a BLE module (not shown) In one embodiment, the unique ID corresponds to these modules in the mobile device MD1 may be encoded (e.g., scrambled, truncated).

In step T5, after the identification information of the mobile device MD1 is received, the power providing equipment 110 enters a Power Transfer phase. In this phase, the processor 112 controls the wireless power transmitter 114 to charge the battery 126 of the mobile device MD1 by utilizing the wireless power signal.

In one embodiment, the processor 112 may periodically receive a control error packet through the communication receiver 116 from the mobile device MD1 in the Power Transfer phase to ensure the communication between the power providing equipment 110 and the mobile device MD1 is valid. When the processor 112 fails to receive the control error packet in a right timing, the processor 112 may control the wireless power transmitter 114 to stop transmitting the wireless power signal and terminate the charging of the battery 126.

In step T6, when the battery 126 is fully charged by utilizing the wireless power signal transmitted from the wireless power transmitter 114 the processor 112 receives a second end power transfer message through the communication receiver 116 from the mobile device MD1.

In step T7, after the processor 112 receives the second end power transfer message, the processor 112 controls the wireless power transmitter 114 to stop the wireless power signal corresponding to the second end power transfer message. At this time, the power providing equipment 110 returns to the Selection phase.

In one embodiment, each of the first end power transfer message, the signal strength packet, the identification information, the control error packet, and the second end power transfer message may be transmitted by an in-band communication attached to the wireless power signal. In one embodiment, these messages and packets may be transmitted by utilizing a load modulation technique, but the present disclosure is not limited to this embodiment. In another embodiment, these messages and packets may be transmitted by an out-band communication that is realized by another type of communication. In one embodiment, these messages and packets may be transmitted by utilizing bluetooth low energy (BLE), but the present disclosure is not limited to this embodiment. In one embodiment, the first end power transfer message, the signal strength packet, and the identification information are received at a beginning of the wireless power transmitter 114 transmitting the wireless power signal to the mobile device MD1.

In one embodiment, the second end power transfer message and the first end power transfer message are different, so that the processor 112 can determine whether the mobile device MD1 is replaced by another mobile device and provide an alarm.

More specifically, the processor 112 can determine whether the mobile device MD1 is replaced by a mobile device MD2 according to whether the first end power transfer message is received after the battery 126 of the mobile device MD1 is charged by utilizing the wireless power signal (i.e., in the Power Transfer phase). When the processor 112 receives a first end power transfer message (which is actually from the mobile device MD2) after the battery 126 of the mobile device MD1 is charged by utilizing the wireless power signal, the processor 112 can determine that the mobile device MD1 is replaced since the first end power transfer message is inadequately presented. In other words, the processor 112 is able to determine whether the mobile device MD1 is replaced by the mobile device MD2 according to whether the first end power transfer message is received after receiving the identification information of the mobile device MD1 from the mobile device MD1.

Details of the formats of the second end power transfer message and the first end power transfer message are described in the paragraphs below with reference to FIGS. 3A-3C.

Figure 3B:
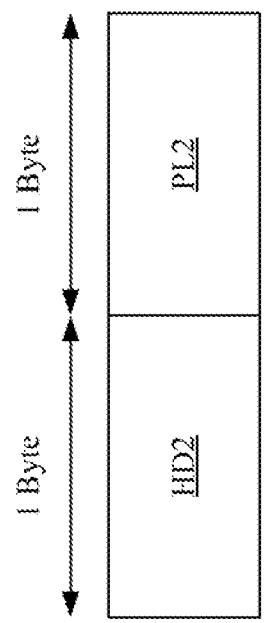
FIGS. 3A-3C illustrate formats of a second end power transfer message and a first end power transfer message in accordance with one embodiment of the present disclosure.
Figure 3A:
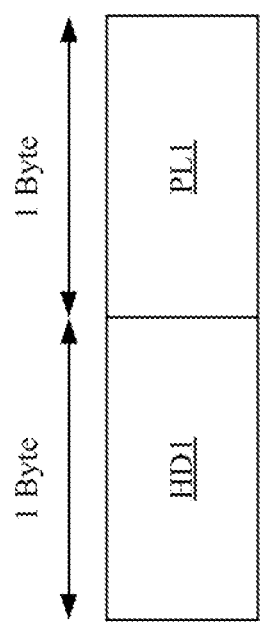

Particular reference is made to FIGS. 3A and 3B. In one embodiment, the second end power transfer message includes a header HD1 and a payload PL1 Both of the header HD1 and the payload PL1 have a length of one byte. The first end power transfer message includes a header HD2 and a payload PL2. Both of the header HD2 and the payload PL2 have a length of one byte.

In one embodiment, the headers HD1, HD2 of the second end power transfer message and the first end power transfer message are different. For instance, the header HD1 of the second end power transfer message may be "0x02", and the header HD2 of the first end power transfer message may be "0x99".

In one embodiment, the payloads PL1, PL2 of the second end power transfer message and the first end power transfer message are different. For instance, the payload PL1 of the second end power transfer message may be "0x01", and the payload PL2 of the first end power transfer message may be "0x09".

Figure 3C:
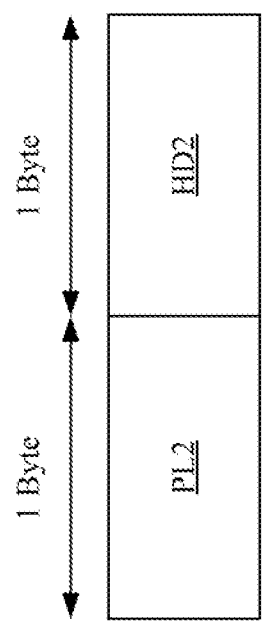

Particular reference is made to FIG. 3C. In one embodiment, the formats of the second end power transfer message and the first end power transfer message are different, For example, in one embodiment, the order of the header HD1 and the payload PL1 of the second end power transfer message is different from the order of a header HD2 and the payload PL2 of the first end power transfer message. That is, the header HD1 is ahead of the payload PL1, and the payload PL2 is ahead of the header HD2.

Through such configurations, the processor 112 is able to distinguish the second end power transfer message and the first end power transfer message.

In some approaches, the format of the second end power transfer message and the first end power transfer message are identical. In such a configuration, when the charged mobile device MD1 is replaced by the mobile device MD2 with full energy (i.e., the power of the battery 136 of the mobile device MD2 is full), the wireless power system 100 may incorrectly determine that the battery 126 of the mobile device MD1 is fully charged according to the first end power transfer message from the mobile device MD2, and fail to provide an alarm.

Compared with the approaches above, in one embodiment of the present disclosure, since the formats of the second end power transfer message and the first end power transfer message are different, the processor 112 can acknowledge that the mobile device MD1 is replaced by another mobile device according to whether the first end power transfer message is received at an incorrect timing.

Details of the present disclosure are described in the paragraphs below with reference to an operating method of a mobile device in FIG. 4. However, the present disclosure is not limited to the embodiment below.

It should be noted that the operating method can be applied to a mobile device having a structure that is the same as or similar to the structure of the mobile device MD1 shown in FIG. 1. To simplify the description below, in the following paragraphs, the embodiment shown in FIG. 1 will be used as an example to describe the operating method according to an embodiment of the present disclosure. However, the present disclosure is not limited to application to the embodiment shown in FIG. 1.

In addition, it should be noted that in the steps of the following operating method, no particular sequence is required unless otherwise specified. Moreover, the following steps also may be performed simultaneously or the execution times thereof may at least partially overlap.

Furthermore, the steps of the following operating method may be added to, replaced, and/or eliminated as appropriate, in accordance with various embodiments of the present disclosure.

Figure 4:
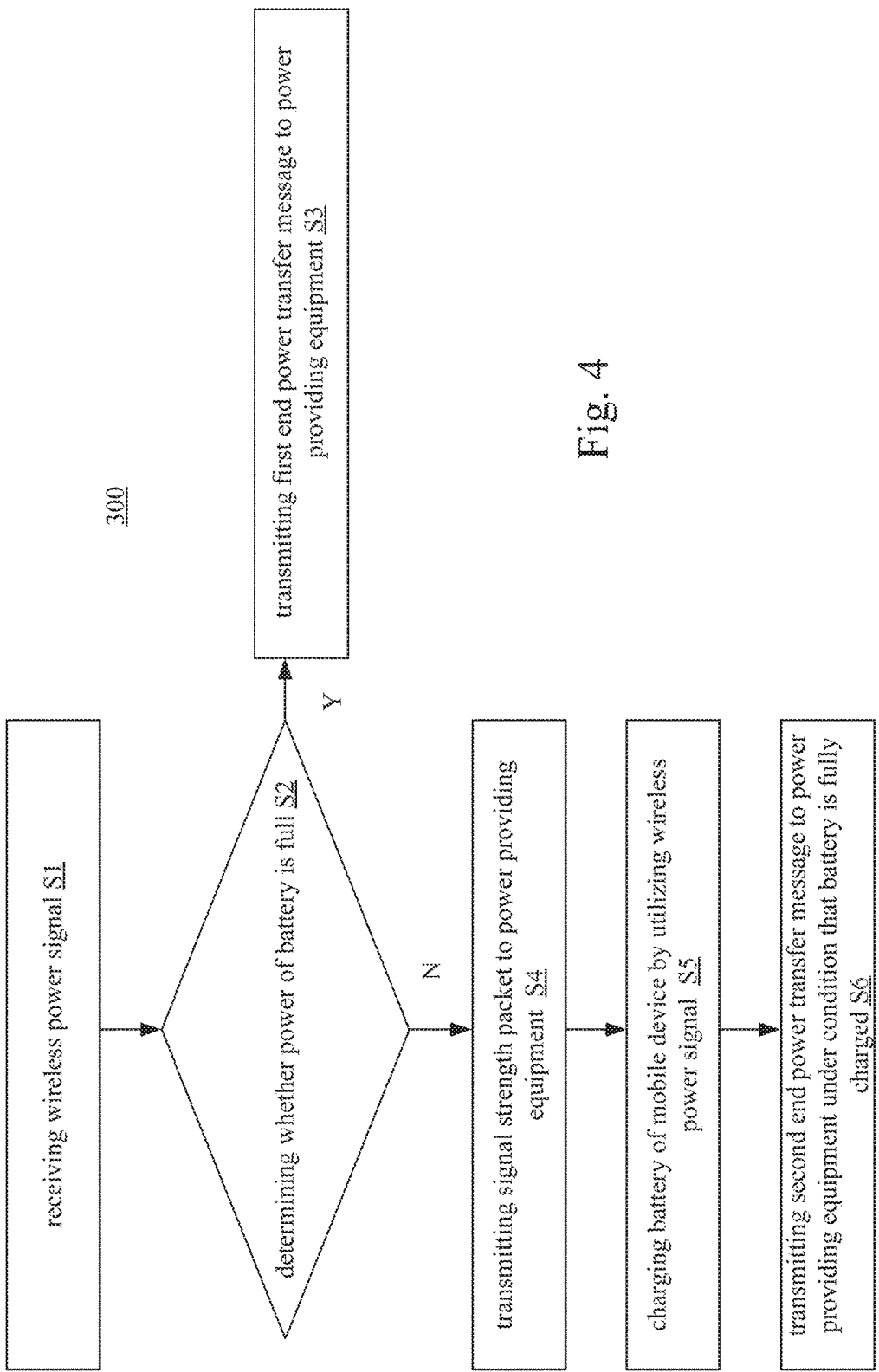
FIG. 4 is a flowchart of an operating method of a mobile device in accordance with one embodiment of the present disclosure.

Reference is made to FIG. 4. The operating method 300 includes the steps below.

In step S1, the mobile device MD1 is in a Selection phase. In such a phase, the wireless power receiver 124 receives a wireless power signal from the power providing equipment 110.

In step S2, the processor 122 determines whether the power of the battery 126 is full after receiving the wireless power signal. If so, step S3 is executed. If not, step S4 is executed.

In step S3, under a condition that the power of the battery 126 is full, the processor 122 controls the communication transmitter 127 to transmit a first end power transfer message to the power providing equipment 110, so that the power providing equipment 110 stops providing the wireless power signal according to the first end power transfer message.

In step S4, under a condition that the power of the battery 126 is not full the processor 122 controls the communication transmitter 127 to transmit a signal strength packet to the power providing equipment 110 and enters an Identification and Configuration phase. In the Identification and Configuration phase, the processor 122 may control the communication transmitter 127 to transmit identification information of the mobile device MD1 to the power providing equipment 110.

In step S5, after the processor 122 controls the communication transmitter 127 to transmit the identification information of the mobile device MD1 to the power providing equipment 110 the mobile device MD1 enters a Power Transfer phase. In such a phase, the processor 122 controls the charging module 128 to charge the battery 126 by utilizing the wireless power signal received from the power providing equipment 110.

In one embodiment, the processor 122 may controls the communication transmitter 127 to periodically transmit a control error packet to the power providing equipment 110 in the Power Transfer phase to ensure the communication between the power providing equipment 110 and the mobile device MD1 is valid.

In step S6, when charging of the battery 126 is fully charged by the charging module 128, the processor 122 controls the communication transmitter 127 to transmit a second end power transfer message with a format different from the first end power transfer message to the power providing equipment 110, so that the power providing equipment 110 stops providing the wireless power signal according to the second end power transfer message. At this time, the mobile device MD1 returns to Selection phase.

In one embodiment, the first end power transfer message, the signal strength packet, and the identification information are transmitted at a beginning of the wireless power receiver 124 receiving the wireless power signal from the power providing equipment 110.

By utilizing the second end power transfer message and the first end power transfer message with different format, the power providing equipment 110 can determine whether the mobile device MD1 is replaced by another mobile device and provide an alarm.

It should be noted that details of the first end power transfer message, the signal strength packet, the identification information, the control error packet, and the second end power transfer message can be ascertained with reference to the paragraphs above, and a description in this regard will not be repeated herein.

Although the present invention has been described in considerable detail with reference to certain embodiments thereof, other embodiments are possible. Therefore, the scope of the appended claims should not be limited to the description of the embodiments contained herein.

What is claimed is:

1. A mobile device comprises:
   a battery;
   a wireless power receiver configured for receiving a wireless power signal from a power providing equipment;
   a communication transmitter;
   a charging module; and
   a processor electrically connected with the battery, the wireless power receiver, the communication transmitter, and the charging module, wherein the processor is configured for:
   controlling the communication transmitter to transmit a first end power transfer message to the power providing equipment under a condition that the power of the battery is full at a beginning of the wireless power receiver receiving the wireless power signal from the power providing equipment, so that the power providing equipment stops providing the wireless power signal according to the first end power transfer message;
   controlling the charging module to charge the battery by utilizing the wireless power signal received from the power providing equipment under a condition that the power of the battery is not full; and
   controlling the communication transmitter to transmit a second end power transfer message to the power providing equipment under a condition that the battery is fully charged by the charging module, so that the power providing equipment stops providing the wireless power signal according to the second end power transfer message;

wherein the first end power transfer message and the second end power transfer message are different, so that the power providing equipment determines whether the mobile device is replaced by another mobile device according to the first end power transfer message and the second end power transfer message.

2. The mobile device as claimed in claim 1, wherein formats of the first end power transfer message and the second end power transfer message are different.

3. The mobile device as claimed in claim 1, wherein payloads of the first end power transfer message and the second end power transfer message are different.

4. The mobile device as claimed in claim 1, wherein headers of the first end power transfer message and the second end power transfer message are different.

5. The mobile device as claimed in claim 1, wherein an order of a header and a payload of first end power transfer message is different from an order of a header and a payload of the second end power transfer message.

6. The mobile device as claimed in claim 1, wherein the processor is further configured for:

controlling the communication transmitter to transmit identification information of the mobile device to the power providing equipment under a condition that the battery is not full at the beginning of the wireless power receiver receiving the wireless power signal from the power providing equipment.

7. The mobile device as claimed in claim 5, wherein the processor is further configured for:

controlling the communication transmitter to transmit a control error packet to the power providing equipment periodically after transmitting the identification information of the mobile device.

8. A power providing equipment comprises:

a wireless power transmitter configured for transmitting a wireless power signal to a mobile device;

a communication receiver; and a processor electrically connected with the wireless power transmitter and the communication receiver, wherein the processor is configured for:

determining whether a first end power transfer message from the mobile device is received, wherein the first end power transfer message indicates a power of a battery of the mobile device is full at a beginning of the wireless power transmitter transmitting the wireless power signal to the mobile device;

controlling the wireless power transmitter to stop transmitting the wireless power signal to the mobile device under a condition that the first end power transfer message is received;

receiving, through the communication receiver, a second end power transfer message from the mobile device under a condition that the battery is fully charged by utilizing the wireless power signal transmitted from the wireless power transmitter;

controlling the wireless power transmitter to stop the power signal corresponding to the second end power transfer message; and determining whether the mobile device is replaced by another mobile device according to the first end power transfer message and the second end power transfer message;

wherein the first end power transfer message and the second end power transfer message are different.

9. The power providing equipment as claimed in claim 8, wherein formats of the first end power transfer message and the second end power transfer message are different.

10. The power providing equipment as claimed in claim 8, wherein payloads of the second end power transfer message and the first end power transfer message are different.

11. The power providing equipment as claimed in claim 8, wherein headers of the second end power transfer message and the first end power transfer message are different.

12. The power providing equipment as claimed in claim 8, wherein an order of a header and a payload of the second end power transfer message is different from an order of a header and a payload of the first end power transfer message.

13. The power providing equipment as claimed in claim 8, wherein the processor is further configured for:

receiving identification information of the mobile device from the mobile device under a condition that the power of the battery is not full at the beginning of the wireless power transmitter transmitting the wireless power signal to the mobile device.

14. The power providing equipment as claimed in claim 13, wherein the processor is further configured for:

determining whether the mobile device is replaced by another mobile device according to whether the first end power transfer message is received after receiving the identification information of the mobile device from the mobile device.

15. The power providing equipment as claimed in claim 8, wherein the processor is further configured for:

receiving another first end power transfer message from another mobile device after charging the battery of the mobile device; and determining the mobile device is replaced by the another mobile device according to the another first end power transfer message.

16. An operating method of a mobile device, the operating method comprising:

receiving a power signal from a power providing equipment;

transmit a first end power transfer message to the power providing equipment under a condition that the power of the battery is full at a beginning of receiving the wireless power signal from the power providing equipment, so that the power providing equipment stops providing the wireless power signal according to the first end power transfer message;

charging the battery by utilizing the wireless power signal received from the power providing equipment under a condition that the power of the battery is not full;

transmitting a second end power transfer message to the power providing equipment under a condition that the battery is fully charged by the charging module, so that the power providing equipment stops providing the wireless power signal according to the second end power transfer message; and determining whether the mobile device is replaced by another mobile device according to the first end power transfer message and the second end power transfer message;

wherein the first end power transfer message and the second end power transfer message are different.

17. The operating method as claimed in claim 16, wherein formats of the first end power transfer message and the second end power transfer message are different.

18. The operating method as claimed in claim 16, wherein payloads of the second end power transfer message and the first end power transfer message are different.

19. The operating method as claimed in claim 16, wherein headers of the second end power transfer message and the first end power transfer message are different.

20. The operating method as claimed in claim 16, wherein an order of a header and a payload of the second end power transfer message is different from an order of a header and a payload of the first end power transfer message.

* * * * *